United States Patent [19]

Hubbard et al.

[11] 4,035,456

[45] July 12, 1977

[54] PROCESS FOR THE MANUFACTURING A CURED EXPANDED NON-CRACKING DIMENSIONALLY STABLE UREA FORMALDEHYDE PRODUCT

[75] Inventors: Donald Arthur Hubbard, Cambridge; Kenneth Atkinson, Stockton-on-Tees, both of England

[73] Assignee: Imperial Chemical Industries Limited, Millbank, England

[21] Appl. No.: 518,966

[22] Filed: Oct. 29, 1974

[30] Foreign Application Priority Data

Nov. 5, 1973 United Kingdom ............ 51225/73

[51] Int. Cl.$^2$ .......................................... B29D 27/00
[52] U.S. Cl. .............. 264/41; 260/2.5 F; 264/45.3; 264/45.5; 264/46.5; 264/53; 264/54; 264/DIG. 2; 264/DIG. 5; 264/DIG. 7; 264/DIG. 17
[58] Field of Search ........ 264/46.5, 51, 54, DIG. 2, 264/DIG. 5, 41, 53, 45.5, DIG. 7, DIG. 17, 45.3; 260/2.5 F; 156/78

[56] References Cited

U.S. PATENT DOCUMENTS

| | | | |
|---|---|---|---|
| 2,016,198 | 10/1935 | Howald | 260/2.5 F UX |
| 2,376,653 | 5/1945 | Boyer | 264/46.5 X |
| 2,611,750 | 9/1952 | White | 260/2.5 F X |
| 2,754,274 | 7/1956 | Boyer | 260/2.5 F |
| 2,754,275 | 7/1956 | Boyer | 260/2.5 F |
| 3,004,293 | 10/1961 | Kreidl | 260/2.5 F X |
| 3,470,115 | 9/1969 | Moore et al. | 260/2.5 F |
| 3,707,414 | 12/1972 | Wismer et al. | 156/78 |

FOREIGN PATENT DOCUMENTS

| | | | |
|---|---|---|---|
| 45-3233 | 7/1965 | Japan | 260/2.5 F |
| 578,838 | 7/1946 | United Kingdom | 260/2.5 F |
| 586,199 | 3/1947 | United Kingdom | 260/2.5 F |

OTHER PUBLICATIONS

Brydson, J. A. "Plastics Materials," Princeton, N. J., D. Van Nostrand, c 1966, pp. 408–417.

*Primary Examiner*—Philip Anderson
*Attorney, Agent, or Firm*—Cushman, Darby & Cushman

[57] ABSTRACT

A strong, expanded moulded panel or board, having a specific gravity between 0.2 and 0.8, is produced by heating dry urea formaldehyde resin containing 4% to 8% volatile materials in a mould at between 130° and 160° C under light restraining pressure between 30 and 300 psi which permits moderate expansion of the resin owing to the gasification of the volatile materials.

3 Claims, No Drawings

PROCESS FOR THE MANUFACTURING A CURED EXPANDED NON-CRACKING DIMENSIONALLY STABLE UREA FORMALDEHYDE PRODUCT

The present invention relates to the manufacture of moulded products containing urea formaldehyde (UF) resin, with or without melamine formaldehyde (MF) resin and/or phenol formaldehyde (PF) resin, and to a process for the manufacture thereof. These moulded products can be produced in the form of boards or other shapes having low specific gravity (0.2–0.8), good mechanical strength, satisfactory resistance to water and weathering, and with far better fire resistance than, for example, expanded polyurethane foam sandwich materials. Panels produced by the process of the present invention are of low cost and can be surfaced to make sandwich boards with synthetic resin skins, which may or may not be reinforced with fibres or fillers, or with wood veneers, metal sheets, paper skins, or other conventional facings.

It is well known that light-weight foamed mouldings of high resin content can be produced from a solution of urea formaldehyde resin, with or without other resins, by mixing therewith a hardening catalyst, which causes gelling and curing of the resin solution, (e.g. an acid or acid-forming catalyst), and a foaming agent. The mixed solution is usually mechanically beaten in order to incorporate finely-divided air bubbles, and is allowed to cure in a mould, with or without heating. Such foamed mouldings generally have very low mechanical strength and usually exhibit great shrinkage, deformation and cracking on curing, due to the loss of the considerable quantities of water present in the mix and also of the water produced during the hardening reaction.

Known commercial methods of producing moulded articles from thermosetting resin moulding powders, in particular urea-formaldehyde, require a very high moulding pressure (e.g. 1000–5000 psi) in substantial moulds and produce a final cured moulded mass having a specific gravity substantially greater than 1.0.

We have now discovered that a substantially dry, powdered, but uncured, urea formaldehyde resin, containing up to about 8% volatile materials, will produce a strong, light-weight, water resistant, non-cracking, dimensionally stable, cured moulded board or other shape, if the powder is heated to, and maintained at, a temperature above 100° C. but below the decomposition temperature of the resin, without the addition of a blowing agent, in a mould adapted to permit the contents thereof to expand, during heating, under light restraining pressure only. The final volume of the moulded product may be at least double the original volume of uncompacted powder charged into the mould.

A preferred urea formaldehyde resin powder for this process is that produced by the known commercial process of spray-drying. The powder from this process normally contains about 4–8% of volatile components (mostly water and losely combined formaldehyde), and has a particle size range of 1 to 200 microns.

During the heating step of the process of this invention, the powder particles first fuse and coalesce, and the volatile components are gasified and dispersed throughout the fused resin mass, causing expansion thereof, and a hard cured and light-weight product is formed with a very uniform interior microstructure.

The process is equally applicable to urea formaldehyde resins produced by methods of drying other than spray-drying, provided that the drying conditions are such that up to about 8% volatiles remain in the dried uncured resin.

The urea formaldehyde resin powder may be partially replaced by other uncured thermosetting synthetic resin powders, for example melamine formaldehyde resin powder and phenol formaldehyde resin powder. Preferably, a mixture of powders is used, comprising a major proportion of urea formaldehyde resin powder (for example about 70% to 95% by weight) and a minor proportion (for example 5% to 30% by weight) of MF and/or PF resin powders. A preferred mixture contains about 75% to 85% of urea formaldehyde resin powder and about 15% to 25% of melamine formaldehyde resin powder.

The temperature to which the powder is heated and maintained in the mould is preferably between about 130° C and 160° C. The moulded product is maintained in the mould at this temperature until it has been sufficiently hot-cured to be removed therefrom, and may then be stored until the cure is complete.

Surprisingly, however, we have found that hot-curing at these temperatures does not necessarily produce an acceptable moulding, and that it is preferable, during the initial heating of the powder, to heat it rapidly so that it has fused and achieved a certain degree of expansion before any substantial curing takes place. This is described in greater detail hereinafter.

The present invention accordingly provides a moulded product made from substantially dry, uncured area formaldehyde resin powder which has been fused, expanded, cured and formed into the product by heating in a mould under light restraining pressure at a temperature above 100° C but below that decomposition temperature of the resin.

The product is light-weight, substantially weatherproof. and its cost per unit volume is about equal to that of conventionally-produced chipboard.

The invention also provides a process for manufacturing moulded products, which comprises the step of heating substantially dry uncured urea formaldehyde resin powder, at a temperature above 100° C but below the decomposition temperature of the resin, in mould under a light restraining pressure so as to produce a cured expanded moulded product.

The effect of the heating, coupled with suitable light restraining pressure so as to control the rate of expansion of the fused mass produces a remarkable and unexpected improvement in the strength, structure and dimensional stability of the formed shape. The process requires no blowing agent.

The restraining pressure (e.g. 5 to 500 psi) can be provided by the weight of the mould lid and/or by applied pneumaticor hydraulic pressure, preferably it is 30 to 300 psi.

EXAMPLE 1

In a series of seven trials, 220 gm. spray-dried UF resin powder was mixed with 55 gm spray-dried MF resin powder and placed in a mould measuring 10 inches × 10 inches × ½ inches and heated in accordance with the process of the present invention. In each of the trials, details were kept of the heating rates, heating times and temperatures. The sample products were examined for quality, and were deemed to be satisfactory only if the powder expanded to produce a cured board completely filling the mould, with good edges and flat surfaces. The results of the trials are given below:

| Trial | Time from beginning of heating (minutes) | Temp. °C | Remarks |
|---|---|---|---|
| 1 | 1 | 37 | Unsatisfactory |
|  | 10 | 93 |  |
|  | 22 | 115 |  |
|  | 30 | 120 |  |
|  | 44 | 134 |  |
| 2 | 1 | 45 | Unsatisfactory |
|  | 11 | 99 |  |
|  | 21 | 113 |  |
|  | 29 | 122 |  |
|  | 42 | 136 |  |
| 3 | 1 | 40 | Unsatisfactory |
|  | 12 | 93 |  |
|  | 36 | 115 |  |
|  | 44 | 132 |  |
| 4 | 1 | 78 | Satisfactory |
|  | 12 | 128 |  |
|  | 22 | 136 |  |
|  | 35 | 142 |  |
|  | 41 | 145 |  |
| 5 | 1 | 90 | Satisfactory |
|  | 14 | 112 |  |
|  | 25 | 125 |  |
|  | 30 | 140 |  |
| 6 | 1 | 101 | Satisfactory |
|  | 13 | 138 |  |
|  | 23 | 147 |  |
|  | 37 | 150 |  |
|  | 48 | 158 |  |
| 7 | 20 | 58 | Unsatisfactory |
|  | 35 | 91 |  |
|  | 50 | 114 |  |
|  | 80 | 140 |  |
|  | 110 | 140 |  |

In trial No. 7 the heating was carried out in a hot air blowing oven. The sample was maintainedat 140° c for a further 1½ hours, but was still not satisfactory.

The results of trials Nos: 1 to 3 (all unsatisfactory) and of trials Nos: 4 to 6 (all satisfactory) show the following contrasts. In trals Nos: 1 to 3, the temperature reached one minute after heating began was only between 37 ° C and 45° C (average 41° C), whereas in trials Nos: 4 to 6 it was between 78° C and 101° C (average 90° C). In trials Nos: 1to 3, the average temperature reached after 11 minutes was only about 95° C, whereas in trials Nos: 4 to 6 it was 126° C after a slightly longer time of 13 minutes. The contrasting temperatures after about 22 minutes were of the order of 115° and 136° C. In the case of the satisfactory products, therefore, the resin powder had been heated more rapidly in the intial stages, the powder particles had fused or coalesced, and the fused mass had expanded to a greater degree than in the case of the unsatisfactory products before polymeric cross-linking and curing supervened. The unsatisfactory result of trial No: 7 can be attributed to the very slow initial rate of heating. The satisfactory or unsatisfactory nature of the product is not, apparently, attributable to the final temperature reached nor to the duration of heating, but rather to the initial rate of heating.

All the above trials were carried out without incorporating a catalyst in the powder mixture. The addition thereto of a suitable catalyst could greatly reduce the rate of heating required to obtain a satisfactory product and the total heating time required for hot-curing.

It is beyond the scope of this specification to give a detailed review of the voluminous literature dealing with catalysts for gelling and curing urea formaldehyde resins and with processes and agents for foaming them. Standard textbooks dealing with these subjects include:

1. "Encyclopaedia of Chemical Technology"by Kirk & Othmer, 1963, Vol. II, Pages 225-258 (The Interscience Encyclopedia Inc., New York)
2. "Amino Resins"by J F Blais, 1959 (Reinhold Book Division, New York) especially pages 11 to 14, 207
3. "Modern Plastics Encyclopaedia", 1967, pages 370-382 (McGraw-Hill Inc, New York)
4. "Amino plastics" by C P Vale, 1950 (Clearer-Hume Press Ltd., London)
5. "Amino plastics" by fP Talet, 1950 (Dunod, Paris)

The cured products resulting from the low pressure, heating process of this invention can be further improved as regards mechanical strength, elasticity and toughness by incorporating various fillers, either in the resin liquor before drying or in the powdered product before heating. These fillers may be fibrous or particulate, or mixtures of both varieties can be used. Examples of some suitable fillers are china clay, fine sand, sawdust and other waste organic fibrous material, choppedfabric, synthetic fibres, glass fibres, asbestos, pigments etc. Up to about 40. by weight of fibrous or particulate fillers can be incorporated.

EXAMPLE 2

230 g of spray-dried urea formaldehyde resin was mixed with an equal weight of calcium formate powder. The mixture was placed between sheets of fine tissue paper in a flat metal mould 12.5mm thick and 250cm square, which was heated in a press to 140° C for 30 minutes, the press being preheated to 140° C before the mixture was put in. The mould was cooled in the press, and a flat board of dimensions 250mm × 280mm × 12.5mm removed. The product had a fine cell structure and was of density 0.52 g cm$^{-3}$.

EXAMPLE 3

Boards were produced following the procedure of Example 2. The following mixtures were charged to the mould:
A. 230 parts UF resin + 230 parts of gypsum
B. 230 parts UF resin + 115 parts of calcium formate
C. 230 parts of UF resin + 115 parts of plaster of paris
D. 230 parts of UF resin + 57 parts of gypsum The products obtained were of good cell structure, and conformed to the shape of the mould. The density of each board was determined as follows:
A. 0.51gcm$^{-3}$
B. 0.39gcm$^{-3}$
C. 0.37gcm$^{-3}$
D. 0.31gcm$^{-3}$ The expanded cured moulded product, particularly if produced in a smooth surfaced mould, has a smooth surface skin. However it can also be used as a core material and be surfaced on one or both sides with paper, fabric, wood veneer, metal sheeting, glass-reinforced polyester or epoxy resins, etc. Such surfaces may or may not be impregnated with thermosetting or other resins, and can be bonded to the core material, either during the heating step or subsequently, if necessary with a suitable adhesive.

The expanded cured moulded product made from urea formaldehyde resin according to the present invention does not readily support combustion, but will carbonise in contact with a flame. Fire-proofing materials can, if desired be incorporated into the powdered resin material before heating.

Panels and shapes can also be prepared, by pelleting or granulating the fully cured product, coating the resulting granules with an adhesive or resinous solution, for example urea resin adhesive, melamine resin, epoxy resin or polyester, and curing the mass in a mould with or without heating and/or pressure.

Pellets or granules of the product may also be used as an aggregate for building materials, such as cement and plaster, for example in the manufacture of light-weight heat and sound insulating building blocks, slabs and structures. They may also be used as light-weight fillers and extenders for cast plastics products, such as loose-fill for roof insulation or for tank contents topping for prevention of evaporation of contents, or as floating blankets. Fine granules can be used as a filter medium in filtration processes. Panels and shapes made from the unfilled or filled product (which, if desired, may also be surfaced) can be used in the building and construction industries, particularly as insulation board, as an economical replacement for conventional chipboard providing water resistance and dimensional stability, or as a replacement for foamed or cellular thermoplastic core materials, such as foamed polyurethane, at considerably lower cost. Light-weight structural sandwich panels can also be made.

The product according to the present invention can also be used for flotation equipment, packaging, and in many other applications.

We claim:

1. A process for manufacturing a molded product which comprises the step of heating substantially dry, uncured urea formaldehyde resin powder, which powder contains up to 8% volatile materials, to a molding temperature above 180° C but below the decompositon temperature of the resin, in a mold under light restraining pressure of between 5 and 500 psi so as to produce a cured expanded non-cracking and dimensionally stable molded product, wherein the powder is heated to said temperature by a rapid initial heating whereby the temperature at the end of one minute is greater than 45° C.

2. The process as claimed in claim 1, wherein the average temperature at the end of 13 minutes is about 126° C.

3. A process as claimed in claim 1, wherein the temperature at the end of 14 minutes is at least about 112° C.

* * * * *